United States Patent
Gaertner

(10) Patent No.: US 10,610,872 B2
(45) Date of Patent: Apr. 7, 2020

(54) HYDRAULIC ASSEMBLY FOR MODULATING A BRAKE PRESSURE OF A WHEEL BRAKE, WHICH CAN BE COUPLED FLUIDICALLY TO THE HYDRAULIC ASSEMBLY, OF A MOTOR VEHICLE BRAKE SYSTEM WITH ELECTRONIC SLIP CONTROL

(71) Applicant: Robert Bosch GmbH, Stuttgart (DE)

(72) Inventor: Oliver Gaertner, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/885,586

(22) Filed: Jan. 31, 2018

(65) Prior Publication Data

US 2018/0264484 A1   Sep. 20, 2018

(30) Foreign Application Priority Data

Mar. 17, 2017  (DE) .................. 10 2017 204 528

(51) Int. Cl.
*B60T 17/02*  (2006.01)
*B03C 1/28*  (2006.01)
(Continued)

(52) U.S. Cl.
CPC ............ *B03C 1/286* (2013.01); *B03C 1/0332* (2013.01); *B03C 1/288* (2013.01); *B60T 8/3615* (2013.01); *F15B 21/041* (2013.01); *B03C 2201/18* (2013.01); *B03C 2201/20* (2013.01); *B03C 2201/30* (2013.01); *B60T 8/368* (2013.01); *F15B 13/0814* (2013.01); *F15B 13/0885* (2013.01); *F15B 2211/655* (2013.01)

(58) Field of Classification Search
CPC ........ B60T 7/043; B60T 8/368; B60T 17/043; B03C 1/02; B03C 1/0332
See application file for complete search history.

(56) References Cited

U.S. PATENT DOCUMENTS 3,204,413 A * 9/1965 Pace ................... B60T 11/10
210/223
3,411,120 A * 11/1968 Miyata .................. B03C 1/28
209/223.1

(Continued)

FOREIGN PATENT DOCUMENTS

DE         197 24 166 A1   12/1998
DE     10 2013 212 696 A1   12/2014
DE     10 2014 212 385 A1   12/2015

*Primary Examiner* — Bradley T King
(74) *Attorney, Agent, or Firm* — Maginot, Moore & Beck LLP

(57) ABSTRACT

A hydraulic assembly for modulating a brake pressure of a wheel brake of a motor vehicle brake system with electronic slip control includes a housing block through which a brake fluid is configured to flow and which is equipped with an electronically controllable member for setting the brake pressure. The hydraulic assembly also includes at least one particle-filtering device that is fitted with the housing block and forms a magnetic field. Using the particle-filtering device, particles of ferromagnetic material are configured to be filtered out of the brake fluid without reducing a cross-section of a fluid-conducting channel and thereby choking the throughflow of the housing block or hindering the fluid throughflow.

7 Claims, 2 Drawing Sheets

(51) Int. Cl.
*F15B 21/041* (2019.01)
*B60T 8/36* (2006.01)
*B03C 1/033* (2006.01)
*F15B 13/08* (2006.01)

(56) References Cited

U.S. PATENT DOCUMENTS

| | | | | |
|---|---|---|---|---|
| 4,813,294 | A * | 3/1989 | Ukai | B62D 5/10 180/400 |
| 5,577,813 | A * | 11/1996 | Zaviska | B60T 8/34 303/116.4 |
| 6,227,828 | B1 * | 5/2001 | Takeuchi | F04C 2/086 418/47 |
| 8,366,208 | B2 * | 2/2013 | Grundl | B60T 13/686 303/116.4 |
| 2001/0008194 | A1 | 7/2001 | Hori | |
| 2007/0262028 | A1 * | 11/2007 | Flaherty | B03C 1/286 210/695 |
| 2007/0289442 | A1 * | 12/2007 | Waller | B60T 8/368 92/172 |
| 2008/0083468 | A1 | 4/2008 | Clark et al. | |
| 2008/0149549 | A1 | 6/2008 | Lee et al. | |
| 2009/0252631 | A1 * | 10/2009 | Khoo | B03C 1/286 418/55.6 |
| 2013/0105379 | A1 | 5/2013 | Lee | |
| 2015/0298675 | A1 * | 10/2015 | Mayr | B60T 8/368 92/169.1 |
| 2016/0214587 | A1 * | 7/2016 | Tsuruoka | B60T 8/341 |
| 2017/0284558 | A1 * | 10/2017 | Lee | F16K 31/082 |

* cited by examiner

HYDRAULIC ASSEMBLY FOR MODULATING A BRAKE PRESSURE OF A WHEEL BRAKE, WHICH CAN BE COUPLED FLUIDICALLY TO THE HYDRAULIC ASSEMBLY, OF A MOTOR VEHICLE BRAKE SYSTEM WITH ELECTRONIC SLIP CONTROL

This application claims priority under 35 U.S.C. § 119 to patent application no. DE 10 2017 204 528.0, filed on Mar. 17, 2017 in Germany, the disclosure of which is incorporated herein by reference in its entirety.

BACKGROUND

The disclosure concerns a hydraulic assembly for modulating a brake pressure of a wheel brake, which can be coupled fluidically to the hydraulic assembly, of a motor vehicle brake system with electronic slip control.

Such hydraulic assemblies are known from the prior art. As an example, reference is made here to the disclosure of DE 197 24 166 A1. A hydraulic assembly known from this has a housing block through which brake fluid can flow and which is equipped with electronically controllable means for setting the brake pressure. As an example of a means for setting brake pressure, a pump unit comprising two piston pumps is shown. The two piston pumps are placed mutually opposite each other in alignment, in correspondingly provided receivers of the housing block. The respective pump inlet is protected, by means of a particle-filtering device, from particles penetrating the interior of the pump. In particular, metallic particles of high mechanical hardness may cause damage or premature wear on moving and/or sealing components of the piston pumps. The known particle-filtering device works mechanically and has a mesh screen. Mesh screens however have the disadvantage that they constrict the channel cross-section available for fluid flow, choking the throughflow, and hence constitute a flow resistance. Since this flow resistance depends greatly on the temperature and hence the viscosity of the brake fluid, at low ambient temperatures a particularly strong choking effect occurs. This in turn may lead to problems in brake pressure regulation, in particular on highly dynamic braking processes in which a relatively large quantity of brake fluid must be conveyed to the connected wheel brakes in a relatively short time. In addition, DE 10 2013 212 696 A1 describes a so-called soiling switch. This collects ferromagnetic particles in a fluid by means of an electromagnet and triggers a flushing process in a connected fluid system when the collected quantity of particles has reached or exceeded a pre-definable level.

SUMMARY

In contrast, an object according to the disclosure has the advantage that particle-filtering devices having mesh screens may be omitted from motor vehicle brake systems, and the proposed particle-filtering devices forming a magnetic field allow filtration of ferromagnetic particles out of a brake fluid without constricting the available flow cross-section of a channel. The quantity of hydraulic medium flowing through the hydraulic assembly no longer depends on the ambient temperature in the region of a particle-filtering device according to the disclosure, and consequently brake pressure regulation can be performed reliably even on highly dynamic braking processes and at low ambient temperatures.

Further advantages or advantageous refinements of the disclosure arise from the subclaims or the description which follows.

A particularly effective filtration effect is achieved by a particle-filtering device according to the disclosure which is configured in annular form and has a ring opening, through which a channel portion conducting a brake fluid is guided.

Advantageously, the inner wall of the ring opening of the particle-filtering device is identical to the inner wall of a filtered channel portion, because then no intermediate wall influencing the magnetic flux is present between the brake fluid and the wall of the particle-filtering device close to the fluid.

In order to avoid flow resistances at any step transitions, an inner diameter of the ring opening has the same dimensions as an inner diameter of the channel portion.

Suitable particle filtering devices may be formed by a permanent magnet, or by a metal element which can be produced at low cost and is magnetized after forming. This particle-filtering device may be placed in a provided receiver of the housing block of a hydraulic assembly and be anchored therein by force, form-fit and/or material bonding, or may be attached directly or indirectly to the hydraulic assembly from the outside. For the latter case, in particular a fluid-connection element is suitable, which is provided in any case and via which the hydraulic assembly is connected to a line which supplies brake fluid to the hydraulic assembly.

It is furthermore advantageous to combine the particle-filtering device according to the disclosure into one component with a means for controlling brake pressure which is anchored on the hydraulic assembly, because this saves a separate work process for anchoring a separately formed particle-filtering device onto the hydraulic assembly.

BRIEF DESCRIPTION OF THE DRAWINGS

Exemplary embodiments of the disclosure are shown in the drawing and described in more detail below.

DETAILED DESCRIPTION

Figure 1:
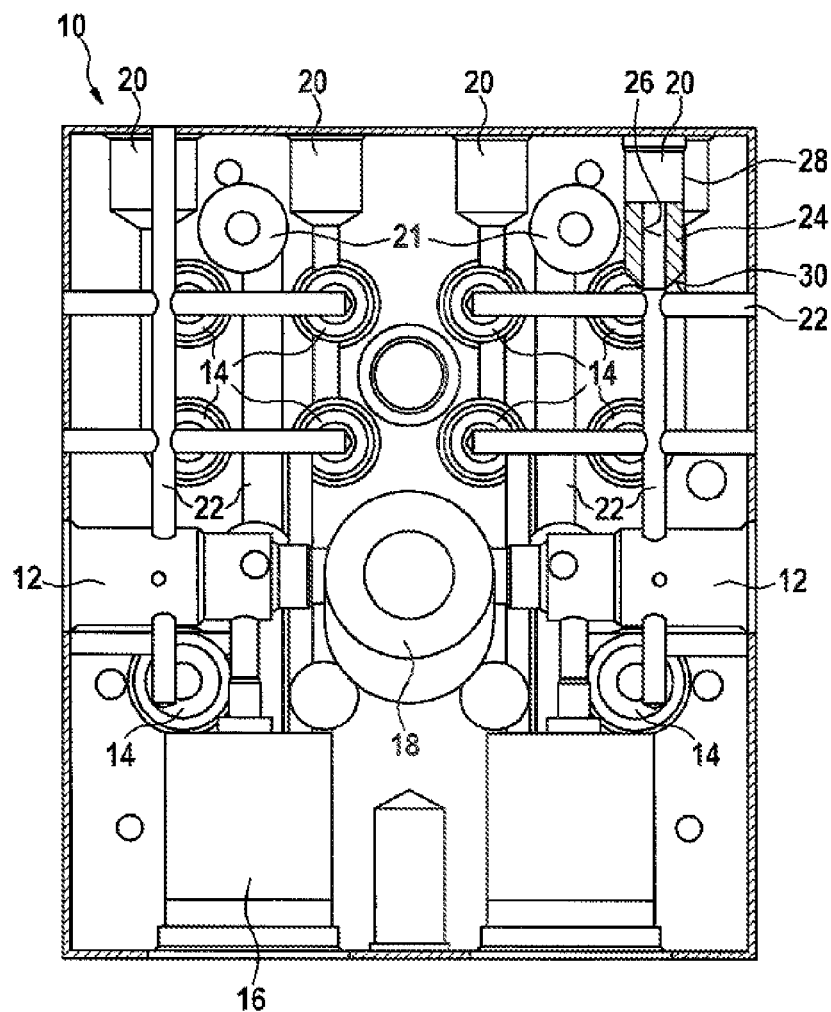
FIG. 1 shows a cross-section through a housing block of a hydraulic assembly with particle-filtering device according to the disclosure, while FIG. 2 discloses a second exemplary embodiment of the disclosure in which the particle-filtering device is formed as an attachment on the hydraulic assembly.

The housing block 10 shown in FIG. 1, in addition to an electronic control unit and an electronically controllable drive motor, constitutes one of the central components of a hydraulic assembly of a motor vehicle brake system with electronic slip control. The drive motor and electronic control unit (not shown) are provided for fixing to mutually opposing outsides of this cuboid housing block 10. They serve for driving pumps of a pump unit arranged on the housing block 10, or also to control valves anchored on the housing block. The cross-section depicted of the housing block 10 shows pump receivers 12 and valve receivers 14; in addition, storage receivers 16, a cam receiver 18, pressure medium ports 20, 21 and numerous connecting channels 22 between these elements are evident. The pressure medium ports 20 opening at the top in FIG. 1 serve for the connection conducting hydraulic medium between the housing block 10 and the wheel brakes of the motor vehicle brake system, while the pressure medium ports 21 opening at the bottom in the drawing plane connect a master brake cylinder of the motor vehicle brake system to the housing block 10.

According to the disclosure, a particle-filtering device 24 forming a magnetic field is arranged as an example in the direct vicinity of one of the pressure medium ports 20 for one of the wheel brakes of the motor vehicle brake system. This particle-filtering device 24 is configured in annular form and encloses with its ring opening 26 a portion of a channel 22 which connects the pressure medium ports 20 to a pump receiver 12. In other words, this channel 22 is guided through the ring opening 26 of the particle-filtering device 24, wherein the wall of the ring opening 26 delimits the channel 22 peripherally. The wall of the ring opening 26 has largely the same inner diameter as the wall of the channel 22, in order to avoid transition steps and hence possible flow resistances. An installation space 28 provided to receive the particle-filtering device 24 is formed by a portion of a channel 22 with wider inner diameter. The installation space 28 axially directly adjoins a pressure medium port 20, through which the particle-filtering device 24 can be inserted from the outside into the housing block 10. An end of this installation space 28 lying inside the housing block 10 forms a conical shoulder 30, which serves to center the particle-filtering device 24 and acts as an axial stop on its insertion in the installation space 28.

A stationary anchoring of the particle-filtering device 24 in the installation space 28 may be achieved for example by force fit, i.e. by pressing the particle-filtering device 24 in place. Alternatively, a form fit anchoring is conceivable, for example by caulking the material of the housing block 10, or by material bonding.

The particle-filtering device 24 itself is a magnetic ring which is preferably made of a permanently magnetic material. A metallic ring which is magnetized after forming would also be conceivable. Brake fluid flowing through the ring opening 26 of the ring and contaminated with metallic particles is cleaned of metallic particles by the magnetic field formed by the particle-filtering device 24. These particles are attracted by the particle-filtering device 24 and adhere to the inner wall of the ring opening 26 without significantly reducing the original flow cross-section. Downstream means for setting brake pressure, i.e. means arranged downstream of the particle-filtering device 24, which are equipped for example with moving parts and/or seals, may thus no longer be exposed to damage caused by magnetic particles and are less susceptible to wear.

Evidently, it is possible to provide several particle-filtering devices 24 according to the disclosure in a housing block 10. Ideally, each pressure medium port 20 through which brake fluid flows to the hydraulic assembly from the outside should be equipped with an assigned particle-filtering device 24.

Figure 2:
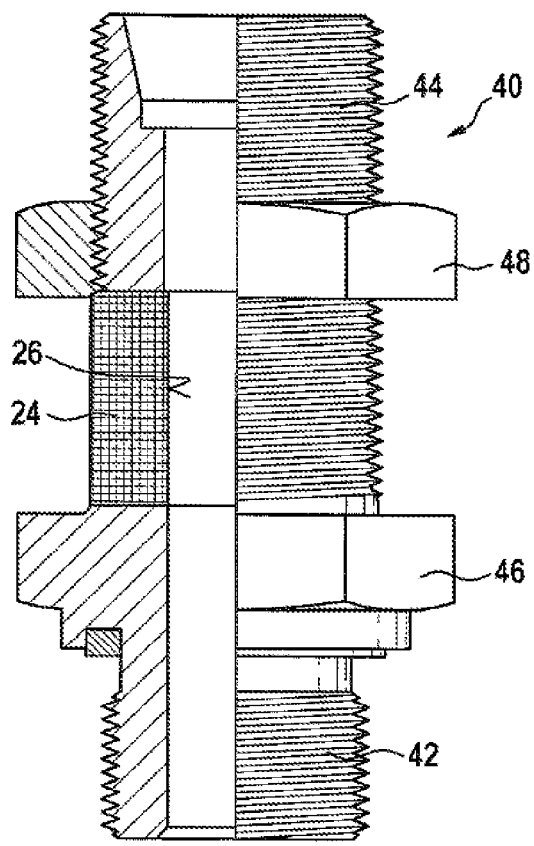

FIG. 2 shows a sleeve-like fluid-connection element 40. This is divided into two mutually opposing threaded portions 42, 44 with an external thread, and a center portion 46 lying in between. Peripherally, the center portion 46 forms a hexagon with 3×2 mutually opposing flat faces, and is intended to allow the fluid-connection portion 40 to be screwed into a counter thread by means of a screw tool. Counter threads may for example be formed on a pressure medium port 20 of the housing block 10 of a hydraulic assembly. The threaded portion 44 protruding relative to the housing block 10 is provided for screwing on a lock nut 48, with which the line carrying brake fluid for example may be connected fluid-tightly to the housing block 10. This protruding threaded portion 44 is configured longer in the axial direction of the fluid-connection element 40 than the threaded portion 42 provided for screwing into the housing block 10, wherein a region of the threaded portion 44 lying in FIG. 2 between the lock nut 48 and the center portion 46 forms a particle-filtering element 24. The fluid-connection element 40 made of ferromagnetic material would be magnetized after its mechanical forming at least in this region.

Alternatively, it would also be conceivable to slide a magnetic, annular particle-filtering element 24 onto the threaded portion 44 of a ferromagnetic fluid-connection element 40, and clamp this against the center portion 46 by means of the lock nut 48, or to screw the particle-filtering element 24 onto the fluid-connection element 40 via an internal thread. Since fluid-connection elements 40 are conventionally made of steel and hence a magnetically conductive material, the magnetic field formed by the particle-filtering element 40 is only slightly influenced by the wall of the fluid-connection element 40, so that a brake fluid flowing through the fluid-connection element 40 can be cleaned of particles as explained above.

Since fluid-connection elements 40 are merely screwed into a pressure medium port 20 of the housing block 10, subsequent replacement of a conventional fluid-connection element by a fluid-connection element 40 with particle-filtering element 24 is possible.

In a further exemplary embodiment, a fluid-connection element 40 formed according to FIG. 2 consists of ferromagnetic material and is magnetized following its mechanical forming. Such a fluid-connection element 40 thereafter itself acts as a magnet which filters metallic particles from a brake fluid flowing through the fluid-connection element 40, without the need for a particle-filtering element 24 to be fitted separately. Fully magnetized fluid-connection elements 40 are also easy to fit later and may have more compact outer dimensions than partially magnetized fluid-connection elements 40.

Evidently, amendments or additions to the exemplary embodiments described above are conceivable without deviating from the basic concept of the disclosure as presented. In this context, it is pointed out that, for example to prevent corrosion, a paint coating, an eloxy coating or another corrosion-inhibiting coating may be applied to a fully magnetized fluid-connection element 40. It is furthermore pointed out that a channel 22 carrying brake fluid need not necessarily be guided through the ring opening 26 of a particle-filtering device 24. It may for example suffice to arrange a channel 22 carrying brake fluid merely inside the magnetic field of the particle-filtering device 24.

What is claimed is:

1. A hydraulic assembly for modulating a brake pressure of a wheel brake of a motor vehicle brake system with electronic slip control, the wheel brake configured to be coupled fluidically to the hydraulic assembly, the hydraulic assembly comprising:
   a housing block through which a brake fluid is configured to flow and which is equipped with an electronically controllable device configured to set the brake pressure; and
   a particle-filtering device configured to filter particles out of the brake fluid, the particle-filtering device including
      a magnet that produces a magnetic field, the magnet being annularly shaped and defining a ring opening through which brake fluid is conducted,
   wherein the particle-filtering device includes a fluid-connection element that is attached to the hydraulic block, the fluid-connection element being configured to mechanically connect to a line that supplies the brake fluid to the hydraulic block in such a way that the brake fluid is conducted through the ring opening before entering the housing block.

2. The hydraulic assembly according to claim 1, wherein the housing block defines pressure medium ports and channels that conduct the brake fluid, and wherein at least one of the pressure medium ports and channels is arranged inside the magnetic field.

3. The hydraulic assembly according to claim 2, wherein the at least one of the pressure medium ports and channels runs through the ring opening.

4. The hydraulic assembly according to claim 3, wherein a diameter of the ring opening is equal to a diameter of the at least one of the pressure medium ports and channels.

5. The hydraulic assembly according to claim 1, wherein the magnet is a permanent magnet.

6. The hydraulic assembly according to claim 1, wherein the a fluid-connection element is formed of a magnetized ferromagnetic material that forms the magnet.

7. The hydraulic assembly according to claim 1, wherein the particle-filtering device is arranged on the housing block separately from the electronically controllable device.

\* \* \* \* \*